US007535959B2

(12) United States Patent
Lightstone et al.

(10) Patent No.: US 7,535,959 B2
(45) Date of Patent: May 19, 2009

(54) APPARATUS, SYSTEM, AND METHOD FOR VIDEO ENCODER RATE CONTROL

(75) Inventors: Michael L. Lightstone, Fremont, CA (US); Stefan Eckart, Munich (DE)

(73) Assignee: NVIDIA Corporation, Santa Clara, CA (US)

( * ) Notice: Subject to any disclaimer, the term of this patent is extended or adjusted under 35 U.S.C. 154(b) by 746 days.

(21) Appl. No.: 10/688,254

(22) Filed: Oct. 16, 2003

(65) Prior Publication Data
US 2005/0084007 A1    Apr. 21, 2005

(51) Int. Cl.
*H04N 7/18* (2006.01)
(52) U.S. Cl. .............................. 375/240.04; 375/240.05
(58) Field of Classification Search ................................. 375/240.01–240.29
See application file for complete search history.

(56) References Cited

U.S. PATENT DOCUMENTS

| | | | |
|---|---|---|---|
| 5,511,054 A * | 4/1996 | Oishi et al. .............. 369/59.27 |
| 5,612,900 A * | 3/1997 | Azadegan et al. ........... 709/247 |
| 5,650,860 A * | 7/1997 | Uz .............................. 382/253 |
| 5,686,964 A * | 11/1997 | Tabatabai et al. ...... 375/240.24 |
| 5,929,916 A | 7/1999 | Legall et al. |
| 5,978,029 A * | 11/1999 | Boice et al. ............ 375/240.14 |
| 5,990,957 A | 11/1999 | Ryoo et al. |
| 6,055,330 A * | 4/2000 | Eleftheriadis et al. ....... 382/154 |
| 6,167,084 A * | 12/2000 | Wang et al. ............ 375/240.02 |
| 6,490,320 B1 * | 12/2002 | Vetro et al. ............ 375/240.08 |
| 6,535,251 B1 * | 3/2003 | Ribas-Corbera ....... 375/240.03 |
| 6,542,549 B1 * | 4/2003 | Tan et al. ................ 375/240.26 |
| 6,567,127 B1 | 5/2003 | Orr et al. |
| 6,654,421 B2 * | 11/2003 | Hanamura et al. ..... 375/240.26 |
| 6,763,067 B2 * | 7/2004 | Hurst .................... 375/240.03 |
| 7,079,581 B2 * | 7/2006 | Noh et al. .............. 375/240.16 |
| 7,099,389 B1 * | 8/2006 | Yu et al. ................. 375/240.12 |
| 7,257,162 B2 * | 8/2007 | Viscito et al. .......... 375/240.25 |
| 2002/0067768 A1 | 6/2002 | Hurst |
| 2002/0085634 A1 | 7/2002 | Morel |

FOREIGN PATENT DOCUMENTS

EP          0 643 537 A      3/1995

(Continued)

OTHER PUBLICATIONS

Nunes P., et al.. "MPEG-4 Compliant video encoding: analysis and rate control strategies" Signals Systems and Computers, 2000. Conference Record of the Thirty-Fourth Asilomar Conference on Oct. 29-Nov. 1, 2000, Piscataway, NJ, USA, IEEE, vol. 1, (Oct. 29, 2000), pp. 54-58.

(Continued)

*Primary Examiner*—Andy S Rao
(74) *Attorney, Agent, or Firm*—Cooley Godward Kronish LLP (57) ABSTRACT

A video encoder includes a programmable rate controller. In one embodiment, the programmable rate controller includes a variable bit rate controller, a constant bit rate controller, and an arbitration logic for selecting one of the two outputs. An embodiment of a variable bit rate controller tracks long-term changes to average bit rate. An embodiment of a constant bit rate controller classifies macroblock types, determines a statistical indicator of complexity for each macroblock type, and generates a target bit rate based on estimated complexity.

31 Claims, 7 Drawing Sheets

FOREIGN PATENT DOCUMENTS

| | | |
|---|---|---|
| EP | 1 091 588 | 4/2001 |
| EP | 1 465 430 | 10/2004 |
| JP | 9510070 | 10/1997 |
| JP | 11346362 | 12/1999 |
| JP | 2001148858 | 5/2001 |

OTHER PUBLICATIONS

Yokoyama, et al., "A scene-adaptive one-pass variable bit rate video coding method for storage media" (Oct. 24, 1999), Image Processing, 1999. ICIP 99. Proceeding. 1999 International Conference on Kobe, Japan, pp. 827-831.

Yu Sun, et al: "Synchronous and asynchronous multiple object rate control for MPEG-4 video coding" Proceedings 2003 International Conference on Image Processing. ICIP-2003. Barcelona, Spain, Sep. 14-17, 2003 vol. 2 of 3 pp. 801-804 (Sep. 14, 2003).

Fan, J., et al: "Real-time video applications over ABR using FASTRAC-a rate control algorithm" IEEE Canadian Conference on Eletrical and Computer Engineering. CCECE 2002. Winnipeg, Manitoba, Canada, May 12-15, 2002, Canadian Conference on Electrical and Computer Engineering, New York, NY: IEEE, US, vol. 1 of 3 (May 12, 2002), pp. 1565-1570.

Ding, et al.; "Rate Control of MPEG Video Coding and Recording by Rate-Quantization Modeling;" *IEEE Transactions on Circuits and Systems for Video Technology*; vol. 6, No. 1; Feb. 1996; pp. 12-20.

On-line document-MPEG.ORG—MPEG Software Simulation Group (MSSG); http://www.mpeg.org/MPEG/MSSG/index.html; Oct. 6, 2003, pp. 1-3.

On-line document-MPEG-2 Test Model 5, http://www.mpeg.org/MPEG/MSSG/tm5; Oct. 6, 2003: Overview: "History and the Surgeon General's Warning about TM-5," pp. 1-5: TOC: "Original TM-5 Table of Contents," pp. 1-4; Chapter 5: "Motion Estimation and Compensation," pp. 1-7; Chapter 6: "Modes and Mode Selection," pp. 1-2; Chapter 7: "Transformation and Quantization," pp. 1-3; Chapter 8: "Coding," pp. 1-9; Chapter 10: "Rate Control and Quantization," pp. 1-5; Appendix A: "Discrete Cosine Transform," p. 1.

\* cited by examiner

APPARATUS, SYSTEM, AND METHOD FOR VIDEO ENCODER RATE CONTROL

FIELD OF THE INVENTION

The present invention generally relates to rate control of video compression encoders. More particularly, the present invention relates to constant bit rate (CBR) and variable bit rate (VBR) control for block-based video encoding, including but not limited to MPEG compatible video encoding.

BACKGROUND OF THE INVENTION

Video compression is commonly used to reduce the data storage and or transmission requirements of a recorded video stream. For example, the Motion Picture Experts Group (MPEG) standards define several commonly used video compression standards.

Figure 1:
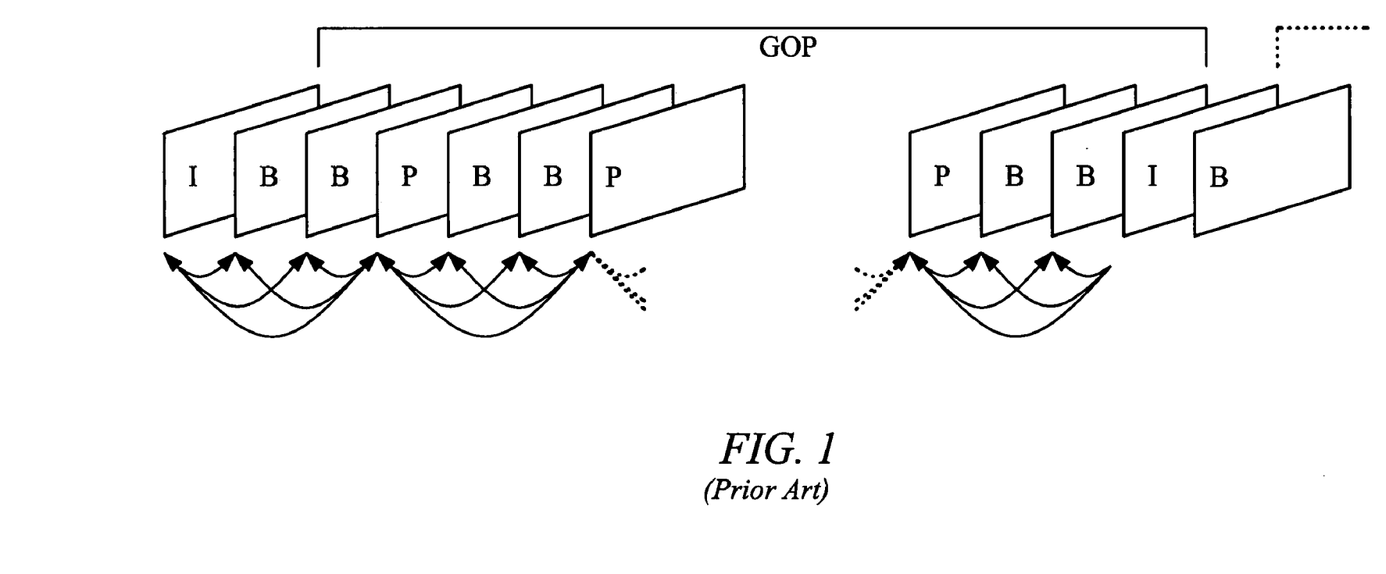
FIG. 1 is prior art drawing illustrating a MPEG group of pictures (GOP).

MPEG-1 is intended for progressive video and is commonly used to store video on compact discs, such as Video Compact Disc (VCD). The MPEG-1 standard defines a group of pictures (GOP). Referring to prior art FIG. 1, each GOP commences with an intra-coded picture frame, I. Motion compensated predictive feedback is used to compress subsequent inter-coded frames, P. Bidirectionally predicted frames, B, are coded using motion compensated prediction based on both previous and successive I or P frames. MPEG-2 adds compression support for interlaced video content.

MPEG video compression divides each individual frame into regions called macroblocks. Individual macroblocks may be predicted from neighboring frames. A discrete cosine transform (DCT) is applied to the frame to compress the frame. The resulting DCT coefficients for each macroblock are then quantized. A variable length encoder is used to encode the data.

A rate controller is used to select the quantization step size, which for a given image complexity will determine the bit rate. In addition, the quality of the image also depends upon the quantization step size. Conventionally, the bit rate, R, is modeled according to the expression: $R=X/Q$, where X is the total image complexity and Q is a quantization step size. Thus, the bit-rate, quantization step size, image complexity, and image quality are inter-related.

The tradeoffs in bit rate/quality that conventional MPEG encoders make is not as sophisticated as desired. For many applications, conventional MPEG encoders do not provide a fine enough level of control, particularly for single-pass MPEG encoders used in real time systems.

Therefore, what is desired is an improved apparatus, system, and method for rate control in an MPEG encoder.

SUMMARY OF THE INVENTION

A programmable rate controller for a video compression encoder is disclosed. In one embodiment, the programmable rate controller includes a variable bit rate encoder generating a first quantization step size, a constant bit rate encoder generating a second quantization step size, and a selector for selecting a maximum permissible quantization step size.

The variable bit controller has a target peak bit rate and a target average bit rate. In one embodiment, the variable bit rate controller adjusts the quantization step so that the average bit rate of the output bitstream of the encoder tracks the target average bit rate. In some embodiments, a proportional integral control technique is used to track the target average bit rate according to a selectable time constant.

In one embodiment, the constant bit rate controller determines a statistical frequency of macroblock types within a current picture, generates a statistical indicator indicative of a complexity of each type of macroblock, predicts picture complexity using the statistical frequency of macroblock types and the statistical indicator of macroblock type complexity, generates a bit allocation consistent with the predicted picture complexity, and assigns a quantizer step size consistent with the bit allocation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
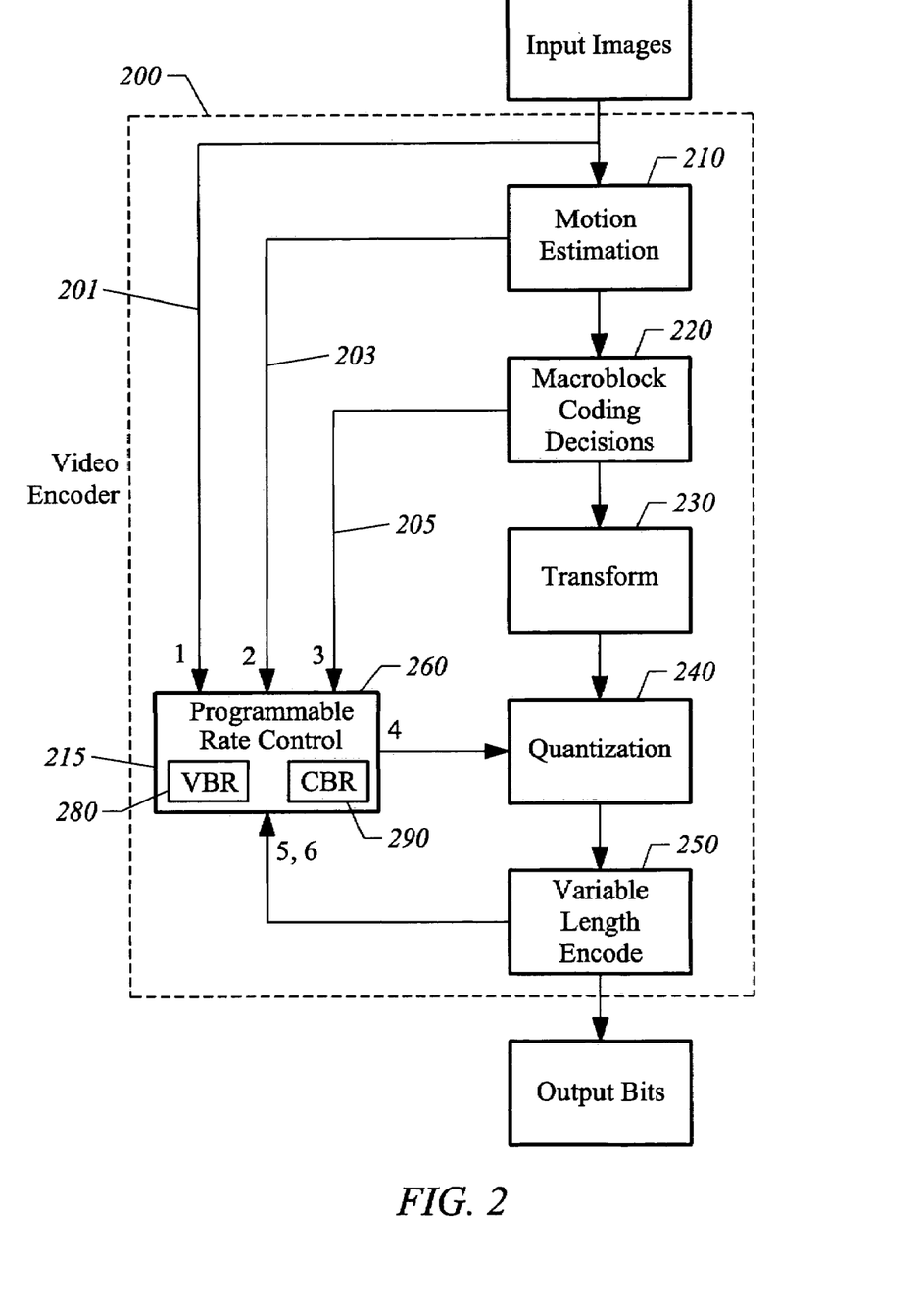
FIG. 2 is a block diagram of a video compression encoder in accordance with one embodiment of the present invention.

FIG. 2 is a block diagram of a video compression encoder 200 in accordance with one embodiment of the present invention. It will be understood that the video compression encoder is adapted to receive video images and encode the video images to generate an output bit stream in compliance with a block-based video compression standard such as MPEG-1, MPEG-2, MPEG-4, or H.264, etc.

Encoder 200 includes an MPEG motion estimation module 210, a macroblock coding decision module 220, a transform module 230 to perform a discrete cosine transform (DCT), a quantization module 240 to quantize the compressed DCT coefficients on a macroblock-per-macroblock basis according to a quantization step size, a variable length encode module 250 for encoding compressed image data into an output bitstream, and a programmable rate controller 260 for selecting the quantization step size. In one embodiment, quantization module 240 includes a virtual quantizer scale that takes on values from 2 to any arbitrarily high value, e.g., 512. An encoder video bitstream verification (VBV) buffer (not shown) may be included in the encoder. A VBV buffer is a model hypothetical decoder buffer used to determine potential decoder buffer underflow and overflow conditions. It is desirable that the bitstream remain VBV compliant such that a corresponding decoder does not suffer a deleterious underflow or overflow condition.

Programmable rate controller 260 is programmed to balance the short-term and long-term output bit production of the encoder against the video quality of the resulting decoded pictures. For MPEG-1 and MPEG-2, this balance may be accomplished by setting the quantization step size of the DCT coefficients on a macroblock-by-macroblock basis to attempt to avoid deleterious decoder buffer states that degrade image quality (e.g., underflow or overflow for constant bit rate encoding).

In one embodiment, programmable rate controller 260 includes a variable bit rate (VBR) rate controller 280, a constant bit rate (CBR) rate controller 290, and a selector (not shown) for selecting an output from either the VBR rate controller 280 or the CBR rate controller 290. In one embodiment, the selector 510 (FIG. 5) picks the rate controller having the largest quantization step size as the output. VBR rate controller 280 permits a variable bit rate mode of operation. CBR rate controller 290 permits a constant bit rate mode of operation. For CBR rate controller 290 the target average and target peak bit rates are the same. For VBR rate controller 280 the target average and target peak bit rate may be set independently.

As described below in more detail, in one embodiment CBR rate controller 290 classifies macroblock types, generates energy estimates of macroblock types, and creates a complexity estimate from macroblock statistics, from which a target bit rate is estimated. Additionally, as described below in more detail, in one embodiment the VBR rate controller 280 creates a target bit allocation by measuring changes in the average bit rate of the output bitstream over time, e.g., by tracking instantaneous and cumulative deviations between the actual and target long-term average bit rates and re-adjusting the target bit allocation accordingly.

The mode of operation (CBR or VBR) of programmable rate controller 260 will depend upon parameter constraints input to programmable rate controller 260 and a logical condition selected for the arbitration logic to choose either CBR or VBR. This permits, for example, the mode of operation to be selected to be entirely CBR, entirely VBR, or to switch back and forth between CBR and VBR depending upon the complexity of the picture frames that are being encoded and other parameters that are selected. As a result, programmable rate controller 260 has a response that may be adapted for different encoding applications by selecting the value of parameter constraints.

Programmable rate controller 260 includes a parameter select input 215 for defining parameters to adjust the function of programmable rate controller 260. As described below in more detail, certain constraints such as the size of the video bitstream verification (VBV) buffer and the peak rate may be selected to guarantee MPEG-2 compliance and/or playback on a specified device, such as a VCD or DVD player. Other constraints, such as the target long-term average bit-rate may be imposed so that applications can predict and/or pre-allocate the size of the output bitstream prior to encoding. Examples of programmable rate control parameters include a target average bit rate, Ravg; a maximum bit rate, Rpeak, corresponding to a maximum bit rate specified in the header of the bitstream used by the video bitstream verification model described below in more detail; a bit rate time constant, τ, for adjusting VBR operation to deviations in average bit rate; a VBV buffer size, Bvbv in bits; a target quantizer scale, Qtarget for all macroblocks used by the VBR rate controller; an initial quantizer scale. Q0 for the VBR rate controller; a minimum quantizer scale value, Qmin, a lower bound on the target VBR quantizer scale value; and a maximum quantizer scale value, Qmax, an upper bound on the target VBR quantizer scale value for a picture. Additionally, other parameters such as a dither update period, and a picture weighting factor may be selected. In one embodiment, if a constant rate flag is set, a VBV-delay field of the picture will be encoded with a non-0xFFFF value for MPEG-2 bitstreams, resulting in true MPEG CBR streams with zero stuffing. It will also be understood that enable/disable signals may be included to enable or disable the CBR rate controller or the VBR rate controller. Some of these parameters are further described in Appendix 1, along with some of the associated limitations in independently setting these parameters caused by the inter-relationship of bit rate, quantizer size, image quality, and image complexity.

Figure 3:
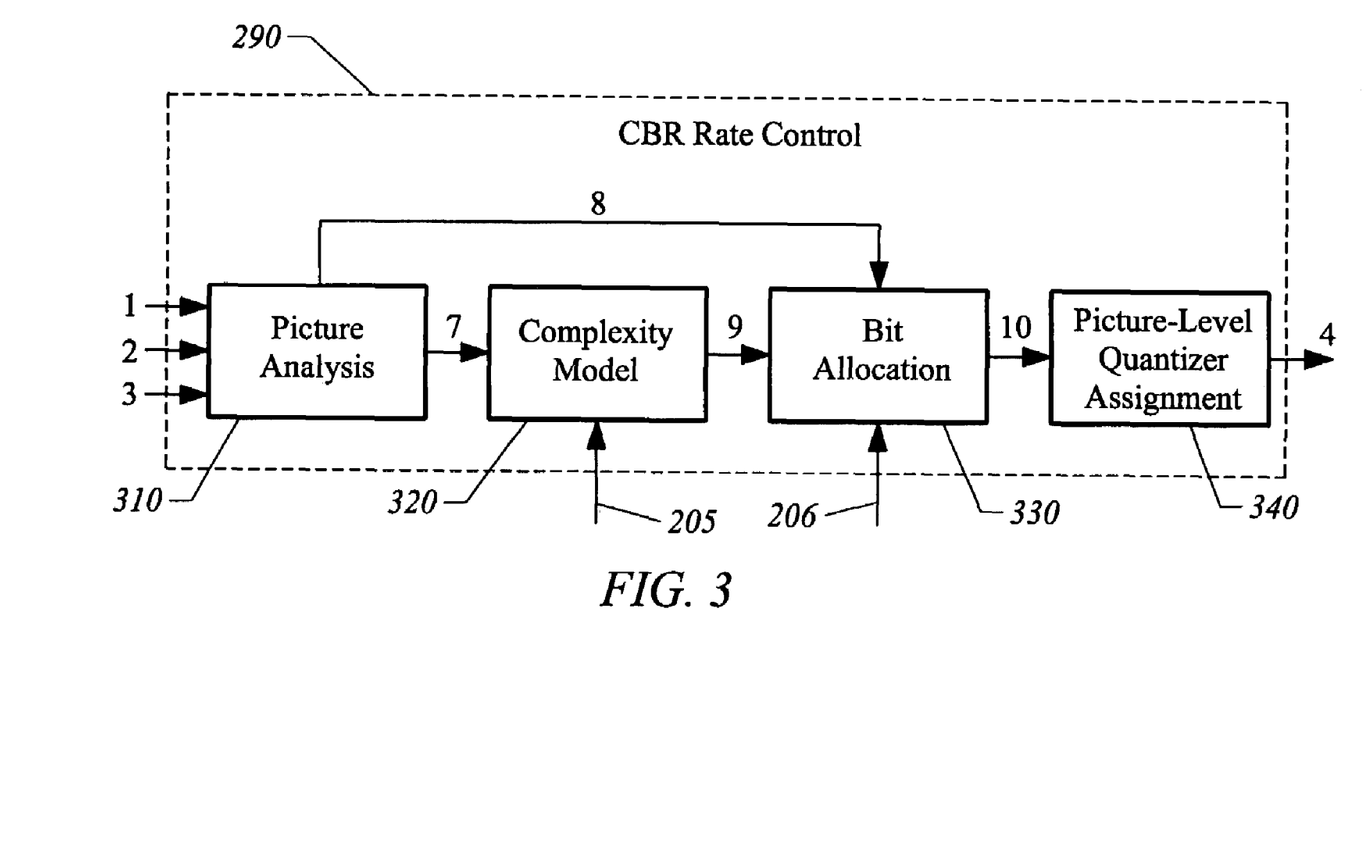
FIG. 3 is a block diagram of a CBR rate controller in accordance with one embodiment of the present invention.

Referring to FIG. 3, in one embodiment CBR rate controller 290 includes a picture analysis module 310, a complexity model module 320, a bit allocation module 330, and a picture-level quantizer assignment module 340. CBR rate controller 290 strives for consistent video quality over a rolling window of N future pictures, where N is a multiple of the GOP size. The requirement for constant bit-rate is achieved implicitly by preventing overflow and underflow in the output bit buffer (the VBV buffer for MPEG compliant encoding). Because the VBV bit buffer is filled at a constant rate once per picture, the bitstream is guaranteed to be CBR compliant if the VBV buffer does not overflow or underflow. The CBR rate controller 290 predicts the relationship between rate and quantizer step size based on statistics in the current picture and on the observed relationship between rate and quantizer step-size in previously encoded pictures. Based on these relationships, bits are allocated for the current picture with the goal of maintaining constant quality over the next N pictures.

It will be understood that the programmable rate controller 290 implements separate rate-quantization models for quantization-dependent and quantization-independent bits. Quantization-dependent bits are encoded bits that vary directly with the quantization step size. For intra blocks, quantization-dependent bits are those bits resulting from the encoding of the AC DCT coefficients. For non-intra blocks, quantization-dependent bits are those bits resulting from the encoding of all DCT coefficients. In both cases, quantization-dependent bits exclude bits resulting from the encoding of motion vectors, headers, and skipped macroblocks. Quantization-independent bits are all non-quantization-dependent bits in a picture. The CBR rate controller 290 creates running estimates for the number of quantization-independent bits in a picture independently for each picture type. The estimates are simply the output of a simple first-order infinite impulse response (IIR) filter operating on the past totals of quantization-dependent bits from pictures of the same type.

Picture analysis module 310 classifies macroblocks by macroblock type and computes a statistical measure called an energy value, indicative of the number of bits required to encode macroblocks of each type. Picture analysis module 310 receives as inputs input image data 1, motion-compensated difference image data 2, and macroblock coding decision data 3 for picture i. A table listing some of the variables used in the rate quantization models is included in Appendix 2. A summary of some of the signals in the rate controller is included in Appendix 3.

In one embodiment, input image data 1 is in the form of luminance values of each pixel, which can be expressed by the equation: $\{P_{x,y}(i,j); j \in J\} P_{x,y}(i,j)$ corresponding to the set of luminance values $P_{x,y}(i,j)$ of each pixel of row x and column y of macroblock j in the original input picture for the set, J, of macroblock indices in a picture. In one embodiment, motion compensated difference image data 2 can be expressed by the equation: $\{R_{x,y}(i,j); j \in J\}$ corresponding to the set of luminance values of each pixel corresponding to row x and column y of macroblock j in the difference image resulting from the motion compensation of picture I for the set J, of macroblock indices in a picture.

For each input picture, picture analysis module 310 classifies the macroblocks by macroblock types having distinct rate-quantization properties. The macroblock types are classified to generate statistics regarding the frequency of macroblocks that have different rate-quantization properties. The set of possible macroblock types is specified by the set K of different macroblocks (where K has at least two members) and is based on the macroblock coding decisions, assumed here to have been made prior to the start of rate control by macroblock coding decisions module 220. Examples of macroblock types in set K may include: intra blocks in an I-picture; intra blocks in a P- or B-picture; non-intra blocks in a P-picture without bi-directional motion compensation; non-Intra blocks in a B-picture without bi-directional motion; and non-intra blocks in a B-Picture with bi-directional motion.

The number of macroblocks of each type within the set, K, is counted. In one embodiment, macroblock counts, $\{\Phi_k(i); k \in K\}$, are computed according to the equation:

$$\Phi_k(i) = \sum_{j \in J} \phi_k(i, j),$$

where $$\phi_k(i, j) = \begin{cases} 1 & \text{if macroblock } j \text{ in picture } i \text{ is of type } k \\ 0 & \text{otherwise,} \end{cases}$$

and J is a set of indices referring to each of the macroblocks in the current picture. Next, the counts are normalized by the total number of macroblocks in the picture, resulting in a set of associated occurrence frequencies, $\{\Gamma_k(i); k \in K\}$, given by the equation:

$$\Gamma_k(i) = \frac{\Phi_k(i)}{\sum_{j \in K} \Phi_j(i)}.$$

Frequency measurements for the current picture are combined with past estimates to generate running frequency estimates, $\{\Gamma_{m,k}(i); k \in K, m \in M\}$, which may be calculated according to the equation:

$$\Gamma_{m,k}(i) = \begin{cases} \alpha(i) \cdot \Gamma_{m,k}(i-1) + (1-\alpha(i)) \cdot \Gamma_k(i) & \text{if } m = n \\ \Gamma_{m,k}(i-1) & \text{otherwise,} \end{cases}$$

where n is the picture type for the current picture. $\Gamma_{m,k}(i)$ may be used to estimate the probability with which a macroblock of type k will occur in a picture of type m.

Picture analysis module 310 also generates statistical information indicative of the number of bits required to encode a macroblock of a particular type with a given quantizer step size. In one embodiment, CBR rate controller 290 uses a difference measurement, such as a mean absolute difference (MAD) measure, of each macroblock type as an activity measurement to calculate an energy value indicative of the number of bits required to encode a macroblock type with a given quantizer step size. In a MAD embodiment, a macroblock type with a comparatively large MAD value is presumed to require more bits to encode than a macroblock type with a smaller MAD value.

For an intra macroblock with index j in picture i the MAD value may be computed as the mean absolute difference between the original luminance pixels, $P_{x,y}(i,j)$, and the mean pixel luminance of the macroblock, $\overline{P}(i,j)$ according to the equation:

$$MAD_{intra}(i, j) = \frac{1}{256} \cdot \sum_{x=1}^{16} \sum_{y=1}^{16} |P_{x,y}(i, j) - \overline{P}(i, j)|.$$

For a non-intra macroblock with index j in picture i the MAD value is calculated as the mean absolute value of the luminance motion compensated differences, values $R_{x,y}(i,j)$ according to the equation:

$$MAD_{non\text{-}intra}(i, j) = \frac{1}{256} \cdot \sum_{x=1}^{16} \sum_{y=1}^{16} |R_{x,y}(i, j)|.$$

Picture analysis module 310 uses the MAD values to calculate an energy value for each macroblock type, with the energy value scaling the MAD value by an empirical factor to provide an approximate indication of image complexity. In one embodiment, an energy measure, $\{e_k(i); k \in K\}$, for each macroblock type is calculated by averaging the MAD values (raised to the power $\beta$) over all macroblocks in each macroblock type according to the equation:

$$e_k(i) = \frac{1}{\Phi_k(i)} \cdot \sum_{j \in J} \phi_k(i, j) \cdot [MAD(i, j)]^\beta.$$

An exemplary value of $\beta$ as determined from empirical investigations is $\beta = 1.45$.

Picture analysis module 310 also generates time averaged energy estimates, $\{\overline{e}_k(i); k \in K\}$ which are also useful for understanding complexity. Time averaged energy estimates may be expressed according to the following equation:

$$\overline{e}_k(i) = \frac{\overline{e}'_k(i)}{\overline{\Phi}_k(i)}$$

and $$\overline{e}'_k(i) = \alpha_k(i) \cdot \overline{e}'_k(i-1) + \Phi_k(i) \cdot e_k(i),$$

$$\overline{\Phi}_k(i) = \alpha_k(i) \cdot \overline{\Phi}_k(i-1) + \Phi_k(i).$$

Referring to FIG. 3, in one embodiment picture analysis module 310 also generates an intra energy output 8 for use by bit allocation module 330 to improve bit prediction inside a VBV compliance check. As described below in more detail, intra energy output 8 is used by bit allocation module 330 to help anticipate sudden changes in picture complexity that otherwise might lead to VBV underflow and overflow. Picture analysis module 310 measures the intra energy, $E_{intra}(i)$, for the current picture by summing the energies of the original pixels for each macroblock in the image. This measurement is useful because I-frames are typically 12 to 15 frames apart. This measurement is combined with previous intra energy estimates to generate a current energy estimate for I-pictures, which may be updated using the following first-order IIR filter equation:

$$\overline{E}_{intra}(i) = \alpha(i) \cdot \overline{E}_{intra}(i-1) + (1-\alpha(i)) \cdot E_{intra}(i)$$

Complexity model module 320 receives the macroblock classification and energy calculations information from picture analysis module 310 and measures the relative coding "complexities" for each of the macroblock types given by $\{x_k(i); k \in K\}$. In one embodiment, the complexity model module 320 models the complexity for a macroblock type m according to the equation:

$$x_k(i) = \frac{1}{\Phi_k(i)} \cdot \sum_{j \in J} \phi_k(i,j) \cdot b(i,j) \cdot q(i,j),$$

where b(i,j) and q(i,j) are respectively the number of quantization dependent bits and the quantization scale used to encode macroblock j from picture i.

Complexity model module 320 also forms running estimates of the macroblock type complexities. The macroblock complexities for the current picture are combined with past values to generate running estimates for the macroblock type complexities, $\{\bar{x}_k(i); k \in K\}$. A variety of factors may be used to create running estimates of the macroblock type complexities such as: including a contribution from all macroblocks of a macroblock type corresponding to a particular time instant; basing the contribution of a particular picture to the running-average complexity estimate for a particular macroblock type to be proportional to the number of macroblocks of that type in the picture; and statistically aging estimates such that the contribution of past macroblocks diminishes with time.

In one embodiment, the following equations are used for computing the running-average estimates for complexity:

$$\bar{x}_k(i) = \frac{\bar{x}'_k(i)}{\bar{\Phi}_k(i)}$$

and $$\bar{x}'_k(i) = \alpha_k(i) \cdot \bar{x}'_k(i-1) + \Phi_k(i) \cdot x_k(i),$$

$$\bar{\Phi}_k(i) = \alpha_k(i) \cdot \bar{\Phi}_k(i-1) + \Phi_k(i),$$

where i is the current picture index, $\alpha_k(i)$ is the aging factor associated with macroblock type k, and $\Phi_k(i)$ is the macroblock count for macroblock type k. The normalizing term in the denominator, $\bar{\Phi}_k(i)$, guarantees that constant input results in constant output.

Complexity model module 320 calculates an estimate of the complexity of the picture, which as described below in more detail, can be used by bit allocation module 330 to adjust the target bit rate. The actual complexity, X(i), of the current picture (as determined after encoding) can be calculated from the encoding complexity, $X_k(i)$, of individual macroblocks, according to the equation:

$$X(i) = \sum_{k \in K} \Gamma_k(i) \cdot x_k(i)$$

A predicted picture complexity can be calculated by substituting estimates of the macroblock complexities, $\{\bar{x}_k(i); k \in K\}$, for the actual macroblock complexities, $\{x_k(i); k \in K\}$ (which won't be known until after the picture is encoded). In addition, the macroblock complexities estimates are scaled for improved accuracy. The scale factors are the ratios of the actual macroblock energies and the macroblock energy estimates. Thus, the predicted picture complexity, $\tilde{X}(i)$, may be calculated according to the equation:

$$\tilde{X}(i) = \sum_{k \in K} \Gamma_k(i) \cdot \bar{x}_k(i-1) \cdot \frac{e_k(i) + e_0}{\bar{e}_k(i) + e_0},$$

where $e_0$ is a small constant (e.g., 0.5) that mitigates the effects of small energy values.

The time averaged picture complexity is also estimated for each picture type. The complexities for each picture type, $\{\bar{X}_m(i); m \in M\}$, are synthesized directly from the macroblock type complexities and their corresponding frequencies according to:

$$\bar{X}_m(i) = \sum_{k \in K} \Gamma_{m,k}(i) \cdot \bar{x}_k(i)$$

Bit allocation module 330 receives complexity model data 9 from complexity model module 320, intra-energy estimates 8 from picture analysis module 310, and VBV fullness data 6 from variable length encoder 250. The complexity model data is used to generate an estimate of an ideal target bit rate, which is then adjusted using the intra-energy estimates and VBV fullness data to maintain VBV fullness and compliance within acceptable limits.

Figure 4:
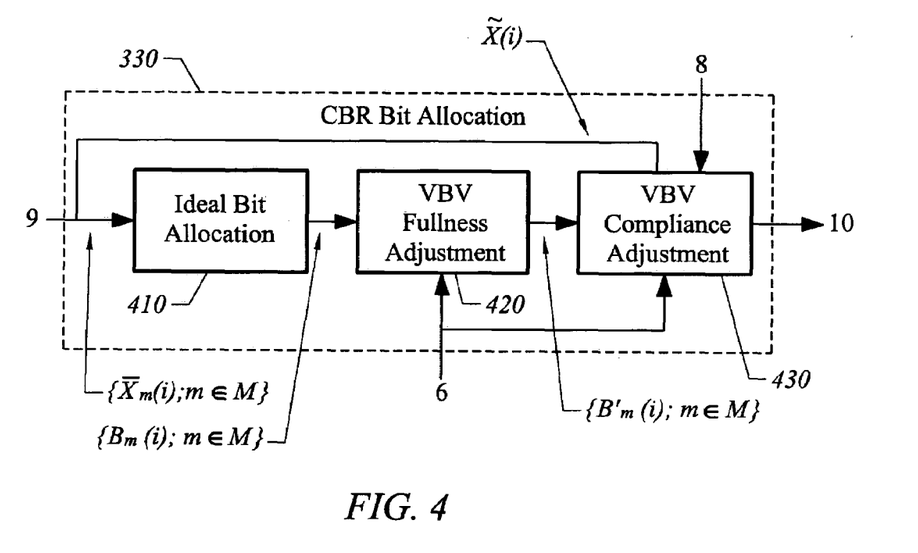
FIG. 4 is a block diagram of a CBR bit allocator in accordance with one embodiment of the present invention.

Referring to FIG. 4, in one embodiment bit allocation module 330 includes an ideal bit allocation module 410, a VBV fullness adjustment module 420, and a VBV compliance adjustment module 430. Ideal bit allocation module 410 starts with a nominal or "ideal" bit budget, B(i) for a forward-looking window, and adjusts it based on the difference between the actual VBV fullness and a picture-adjusted "ideal" VBV fullness, resulting in B'(i). Depending on the outcome of an iterative VBV compliance check, this budget may receive an adjustment to prevent VBV underflow. The final budget, B"(i), determines the bit allocation and subsequent quantizer assignment for the picture.

In one embodiment, ideal bit allocation module 410 receives $\{\bar{X}_m(i); m \in M\}$; which is the estimated complexity for pictures of type m after encoding picture i and M is the set of picture types (I, P, or B). From this data, ideal bit allocation module 410 generates ideal/target bit allocations, where $\{B_m(i); m \in M\}$ is the ideal/nominal CBR bit allocation for pictures of type m prior to encoding picture i for each picture type, according to the equation:

$$B_m(i) = \frac{\frac{\bar{X}_m(i-1)}{W_m} \cdot B(i)}{\sum_{n \in M} \frac{\bar{X}_n(i-1)}{W_n} \cdot N_n},$$

where B(i) is the bit budget for the next N pictures, m is the picture type index, $W_m$ is a parameter indicating the relative weighting for pictures of type m, and $N_m$ is the number of pictures of type m within a window of N pictures (usually but not necessarily a GOP). Note that the bit allocation is dynamically updated on a per-picture basis using a forward-looking rolling window.

The target bit allocation algorithm is based on several assumptions. The first assumption is that the sum of the bit allocations for each of the pictures must equal the total bit budget for all of the pictures. Second, it is assumed that it is desirable to achieve constant quality video over all pictures, which implies a single quantizer scale factor for all picture types in the rolling window. Finally, it is assumed that the following simplified equation between the bit production for each picture type, $B_n$, the quantizer scale factor, Q, and the weighted complexity, $X_n/W_n$ applies:

$$B_n = \frac{X_n}{W_n \cdot Q}.$$

VBV fullness adjustment module 420 receives the target/ideal bit allocation and also a signal indicative of VBV(i−1) where VBV(i) is the VBV fullness after encoding picture i. The CBR bit allocation module 330 strives to achieve an "ideal" VBV(i) fullness N pictures into the future. This "ideal" VBV buffer fullness, $VB_{ideal}(i)$, represents the steady-state fullness of the VBV buffer under the assumption that the encoder is allocating and generating bits in accordance with the specified CBR bit-rate and in accordance with the target bit allocation model using the nominal or "ideal" bit budget of:

$$B(i)=N \cdot B_{peak},$$

where $B_{peak}(i)=R_{peak}/F$. (Note that for CBR, the peak and average rates are equal.)

The effect of N is such that as N increases, the algorithm reacts more slowly to deviations from the nominal or "ideal" VBV buffer fullness. A larger N provides a greater opportunity for constant quality video, but also a greater risk for VBV underflow. If an ideal VBV fullness is specified immediately prior to encoding the first I-frame, the ideal VBV fullness, $VBV_{ideal}(i)$, can be determined for all remaining pictures in the rolling window using the ideal IPB bit allocation. Thus, it is desirable to assign a relatively full buffer just prior to encoding the I-frame, since I-frames usually generate the most bits per picture. Also, note that $VBV_{ideal}(i)$ is shift invariant for multiples of N, i.e., $$VBV_{ideal}(i+N)=VBV_{ideal}(i).$$

In order to achieve ideal VBV fullness N pictures into the future, VBV fullness adjustment module 420 may adjust the nominal total bit budget, B(i), up or down based on the difference between the actual VBV fullness, VBV(i), and the ideal fullness, $VBV_{ideal}(i)$, according to the formula:

$$B'(i)=N \cdot B_{peak}-VBV_{ideal}(i-1)+VBV(i-1).$$

Assuming the bits are produced in accordance with the bit allocation model, the above equation ensures that ideal VBV fullness will be achieved in N pictures. Based on B'(i), the rate control creates a bit allocation, $\{B'_m(i); m \in M\}$ based on the modified bit budget.

VBV compliance check module 430 employs an iterative VBV compliance check that will reduce the proposed total bit budget, B'(i), to prevent VBV underflow if VBV underflow is predicted to occur. The compliance process accomplishes this task by predicting the future path of VBV fullness, $VBV_{predict}(i)$, for the next N pictures based on an assumption that the encoder generates bits in a predetermined way. For the most part, the CBR algorithm assumes bits will be produced in accordance with the proposed bit allocation. However, there are two exceptions. Specifically, the rate control assumes bits are generated according to:

$$B_{predict}(i)=\gamma(i) \cdot B'_{m_j}(i_{curr}),$$

for i=$i_{curr}, \ldots, i_{curr}$+N−1, where $m_i$ is the picture type for picture i, $i_{curr}$ is the index of the current picture, and γ(i) is a scaling factor given by:

$$\gamma(i) = \begin{cases} \tilde{X}(i)/\overline{X}_{mi}(i-1), & \text{if } i = i_{curr} \\ E_{intra}(i_{curr})/\overline{E}_{intra}(i_{curr}-1), & \text{if } m_j = \text{intra} \\ 1.0, & \text{otherwise} \end{cases}$$

The compliance algorithm initializes $VBV_{predict}(i)$ to:

$$VBV_{predict}(i_{curr}-1)=VBV(i_{curr}-1),$$

and updates it according to:

$$VBV_{predict}(i)=VBV_{predict}(i-1)+B_{peak}-B_{predict}(i).$$

If at some point $VBV_{predict}(i)$ drops below a specified minimum threshold $VBV_{min}$, the algorithm reduces the bit allocation based on the following update procedure:

$$B''(i_{curr}) = B'(i_{curr}) - \frac{B'(i_{curr})}{\sum_{i=i_{curr}}^{i_{err}} B_{predict}(i)} (VBV_{min} - VBV_{predict}(j)),$$

where $i_{err}$ is the future picture index predicted to cause VBV underflow. Once the total bit budget is reduced, the CBR algorithm repeats the VBV compliance check using the reduced bit allocation, B''(i). The equation for B''(i) is derived by imposing the constraint that $VBV_{predict}(i_{err})$ will equal $VBV_{min}$.

The output 10 of VBV compliance adjustment is a bit budget, B''(i), and corresponding bit allocation, $\{B''_m(i); m \in M\}$, that is predicted to avoid VBV underflow over the next N pictures. Using this bit allocation, quantization module 240 may generate a target quantizer step size for the current picture using formula:

$$Q_{CBR}(i) = \frac{\overline{X}_{m_i}(i)}{B''_{m_i}(i)},$$

where $m_i$ is the picture type of picture i.

Prior to encoding, the target quantizer scale for each macroblock, which is nominally a real value, must be converted to an integer for compatibility with MPEG. A dithering algorithm may perform a translation at a specified update rate.

Figure 5:
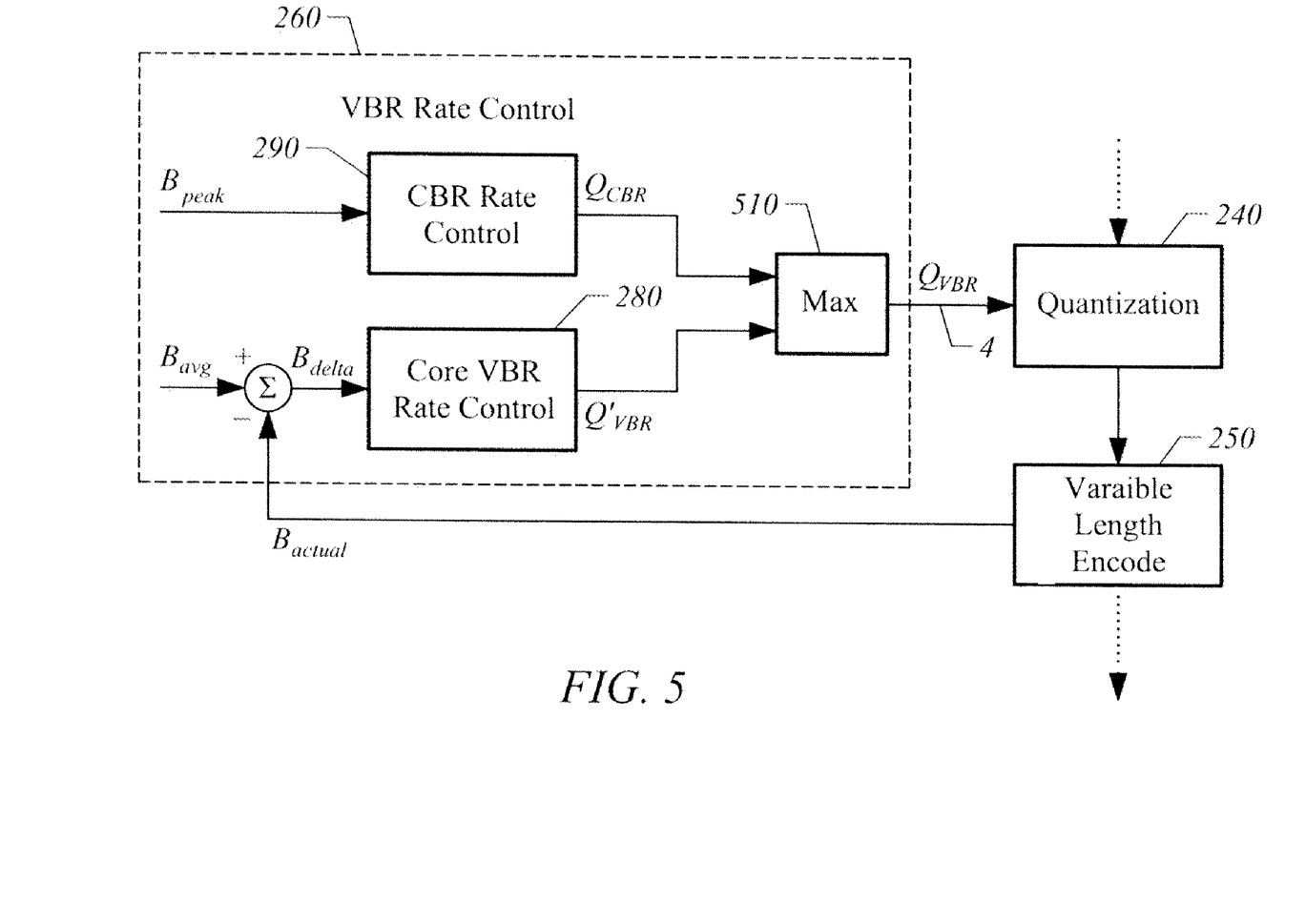
FIG. 5 is a block diagram of a dual CBR/VBR rate controller in accordance with one embodiment of the present invention.

Referring to FIG. 5, in one embodiment programmable rate controller 260 includes a CBR rate controller 290 and a core VBR rate controller 280. The CBR rate controller 290 and the core VBR rate controller 280 make independent calculations of bit rate and a selection module 510 selects the maximum of the two bit rates. The final VBR quantizer scale, $Q_{VBR}$, is selected as the larger of the two proposed values:

$$Q_{VBR} = \begin{cases} \tilde{Q}_{VBR} & \text{if } \tilde{Q}_{VBR} > Q_{CBR} \\ Q_{CBR} & \text{otherwise.} \end{cases}$$

In one embodiment, the core VBR rate controller 280 creates a target bit allocation, $B_{VBR}(i)$, for each picture by tracking the long-term average bit-rate. A variety of tracking techniques may be used. These may include, for example, filters to filter out short term deviations in bit rate while permitting the long-term average bit-rate to vary slowly with respect to subsequent pictures within a group of pictures. One suitable tracking technique is to use proportional integral control techniques to select a response that is selectable by inputting a time constant that determines the nature of the response.

Figure 6:
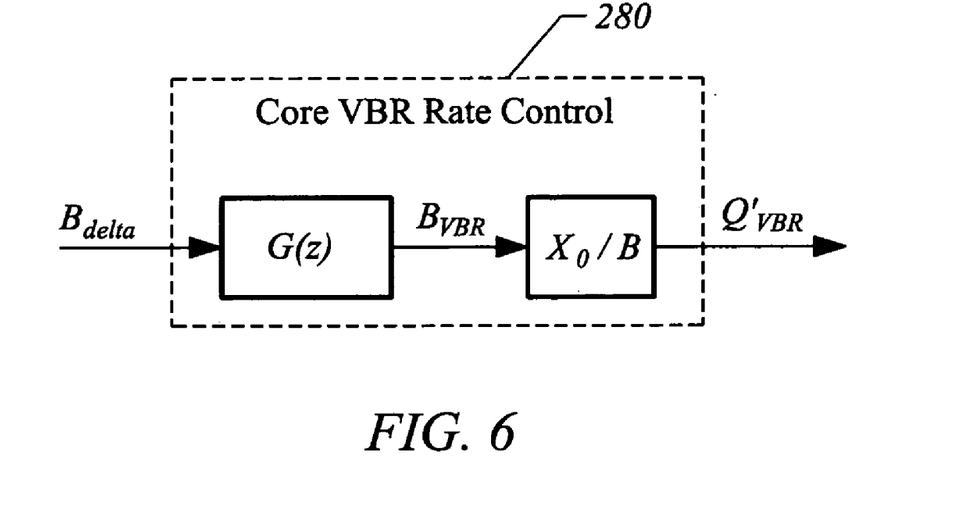
FIG. 6 is a block diagram of a core VBR rate controller in accordance with one embodiment of the present invention.

FIG. 6 is a block diagram illustrating a model of the core VBR rate controller 280 having a second-order Proportional-Integral (PI) controller to track the long-term average bit rate. A difference in bit rate, $B_{delta}$ between the average bit rate, $B_{avg}$, and the actual bit rate, $B_{actual}$ is used as an input to adjust the long-term average bit rate. The target VBR bit rate is given by:

$$B_{VBR}(i) = B_{VBR}(i-1) + K_p \cdot B_{delta}(i) + K_i \cdot A(i),$$

where $B_{delta}(i)$ represents the instantaneous bit-rate deviation and is given by:

$$B_{delta}(i) = B_{avg} - B_{actual}(i-1),$$

where $A(i)$ represents the cumulative bit-rate deviation and is given by:

$$A(i) = A(i-1) + B_{delta}(i).$$

and where $B_{actual}(i)$ is the actual bits generated by the encoder for picture i and $B_{avg}$ is $R_{avg}/F$.

These update equations result in an open-loop transfer function given by:

$$G(z) = \frac{B_{VBR}(z)}{B_{delta}(z)} = \frac{(K_i + K_p) - K_p z^{-1}}{(1 - z^{-1})^2}.$$

The target bit allocation is used to derive the proposed quantizer scale for the core VBR algorithm, $Q'_{VBR}$, according to the formula:

$$Q'_{VBR}(i) = \frac{X_0}{B_{VBR}(i)},$$

where $X_0$ represents a nominal measure of complexity given by $X_0 = Q_0 \cdot B_{avg}$ with $Q_0$ corresponding to the initial desired quantizer scale. This equation models the inverse relationship between the quantizer selection and the output bits produced by quantization and variable length encoding.

Figure 7:
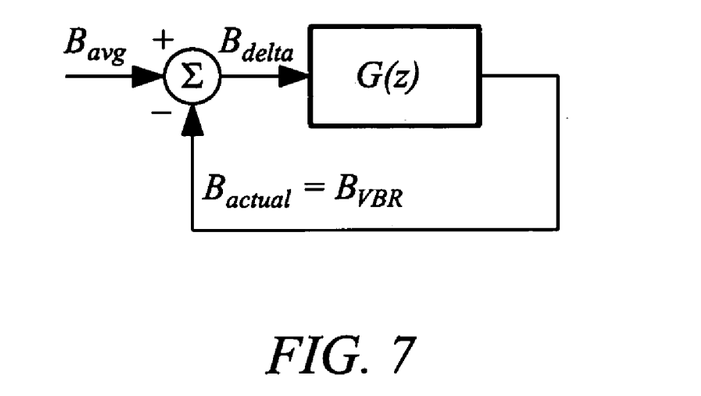
FIG. 7 is a block diagram of an equivalent model of a VBR rate controller for one set of conditions.

As illustrated in FIG. 7, for the case that the rate-quantization model $(X_0/B_{VBR})$ is accurate, then the $X_0/B_{VBR}$ term and the quantization and variable length encoding blocks cancel each other out, i.e., $B_{VBR}(i) \approx B_{actual}(i)$, and the VBR rate controller model reduces to the traditional linear feedback control system with a feedback transfer function, $H(z)$, given by:

$$H(z) = \frac{B_{VBR}(z)}{B_{avg}(z)} = \frac{G(z)}{1 + G(z)} = \frac{(K_i + K_p) - K_p z^{-1}}{(1 + K_i + K_p) - (2 + K_p) z^{-1} + z^{-2}}.$$

For a first-order system, $K_i = 0$ and $K_p$ can be determined directly from the desired time constant τ according to:

$$K_p = e^{T/\tau} - 1.$$

For second-order control, we simply replicate the pole ($p = 2 - e^{T/\tau}$) from the first order system, resulting in PI coefficients given by:

$$K_p = 2 \cdot \left(\frac{1-p}{p}\right),$$

and $$K_i = \frac{K_p^2}{4}.$$

Using a bilinear transformation, the feedback transfer function, $H(z)$ can be mapped into the Laplace domain and equate the resulting transfer function with the closed loop transfer function of a traditional analog second-order PI control system (with the additional assumption that the sample rate is quite large compared to the frequency range of interest). This mapping permits computation of estimates for traditional linear control system parameters such as the undamped natural frequency, $\omega_n$, the time constant, τ, the damping factor, ξ, given by:

$$\omega_n = \frac{\sqrt{K_i}}{T},$$

$$\xi = \frac{K_i + K_p}{2\sqrt{K_i}},$$

and $$\tau = \frac{1}{\xi \omega_n}.$$

One benefit of the rate controller of the present invention is that it may be used for real time applications requiring a small time delay. In particular, the rate encoder may be implemented as a computationally efficient single pass rate encoder, i.e., a rate encoder not requiring multiple iterations of data to estimate the complexity of a picture with a sufficiently high accuracy to avoid VBV overflows and underflows.

Another benefit of the present invention is that the parametric constraints may be set for the needs of particular applications to achieve flexible tradeoffs between rate and quality. $R_{peak}$ and $B_{vbv}$, are set to ensure a VBV compliant output bitstream. For many applications, these values determine what classes of decoders are guaranteed to play the bitstream. For example, the maximum compatible values for DVD correspond to $R_{peak} = 9.8$ Mbs and $B_{vbv} = 1,835,008$ bits. Likewise, the constrained parameter limitations for MPEG-1 are $R_{peak} = 1.856$ Mbs and $B_{vbv} = 327,680$ bits.

As one example, the rate controller can be set to a constant quality mode to provide the highest quality. For this case, $Q_{target}$ is set to the desired quality level. $R_{peak}$, $B_{vbv}$, and a VBV Compliance Flag are set appropriately if VBV compliance is desired. However, a drawback of constant quality is that it results in an unpredictable file size.

In another mode of operation, the best possible quality is selected for a predetermined file size. In one embodiment, the settings for this mode of operation include: setting $R_{avg}$ with long term average bit rate goal; setting the time-constant, τ, to a large value to minimize the effect of short-term bit rate production on quality such that τ is preferably longer than the longest expected scene of any given complexity; setting $Q_0$ to an appropriate initial value for the VBR algorithm; setting $Q_{min}$ to an appropriate value so the encoder will not overly produce bits for simple content to maintain the average bit rate goal; setting $Q_{max}$ to an appropriate value so the encoder will not overly quantize complex scenes to maintain the average bit rate goal; and setting $R_{peak}$, $B_{vbv}$ and setting a VBV Compliance Flag to enable VBV compliance. An advantage of this mode of operation is that it provides the best possible quality for a predetermined file size. However, it has the drawback that medium and high complexity scenes will end up with the same number of bits if the scene length is longer than the specified VBR time-constant.

Another mode of operation is a true CBR video mode. The settings for this mode correspond to setting $R_{peak}$ to a desired bit-rate; setting the constant Rate Flag to true; and setting $B_{vbv}$, and the VBV Compliance Flag appropriately for VBV compliance. An advantage of this mode is that it provides true CBR video that can be written to VCD. However, a drawback is that the video quality is lower compared to other modes. As an example of CBR video mode for a VCD, the settings may be set to $R_{avg}=R_{peak}=1.15$ Mbs and $B_{VBV}=327,680$ bits and setting a constant rate flag to be true.

Consider the example of burning a compact disk with $R_{peak}=9.8$ Mbs and $B_{VBV}=1,835,008$ bits. $R_{avg}$ need not equal $R_{peak}$ and is determined by the storage capacity of the medium and the duration of the source content, and a compromise in rate must be made to fit on the disk at the expense of perfect video quality. A constant rate flag is set to false for this case. For this case, freedom exists to specify $Q_{min}$, but not $Q_{max}$ (since it may prevent the rate control algorithm from achieving $R_{avg}$).

For a personal video recorder (PVR) the constraints on $R_{avg}$ are not tight, assuming a large hard drive memory storage capacity for storing compressed MPEG files. More freedom exists to choose $R_{avg}$, $R_{peak}$ and $B_{VBV}$. Freedom exists to specify $Q_{min}$ and $Q_{max}$ since the constraint on $R_{avg}$ is soft. For a large hard drive, quality effectively trumps rate, i.e., it is probably better to exceed $R_{avg}$ instead of degrading the video quality.

Figure 8:
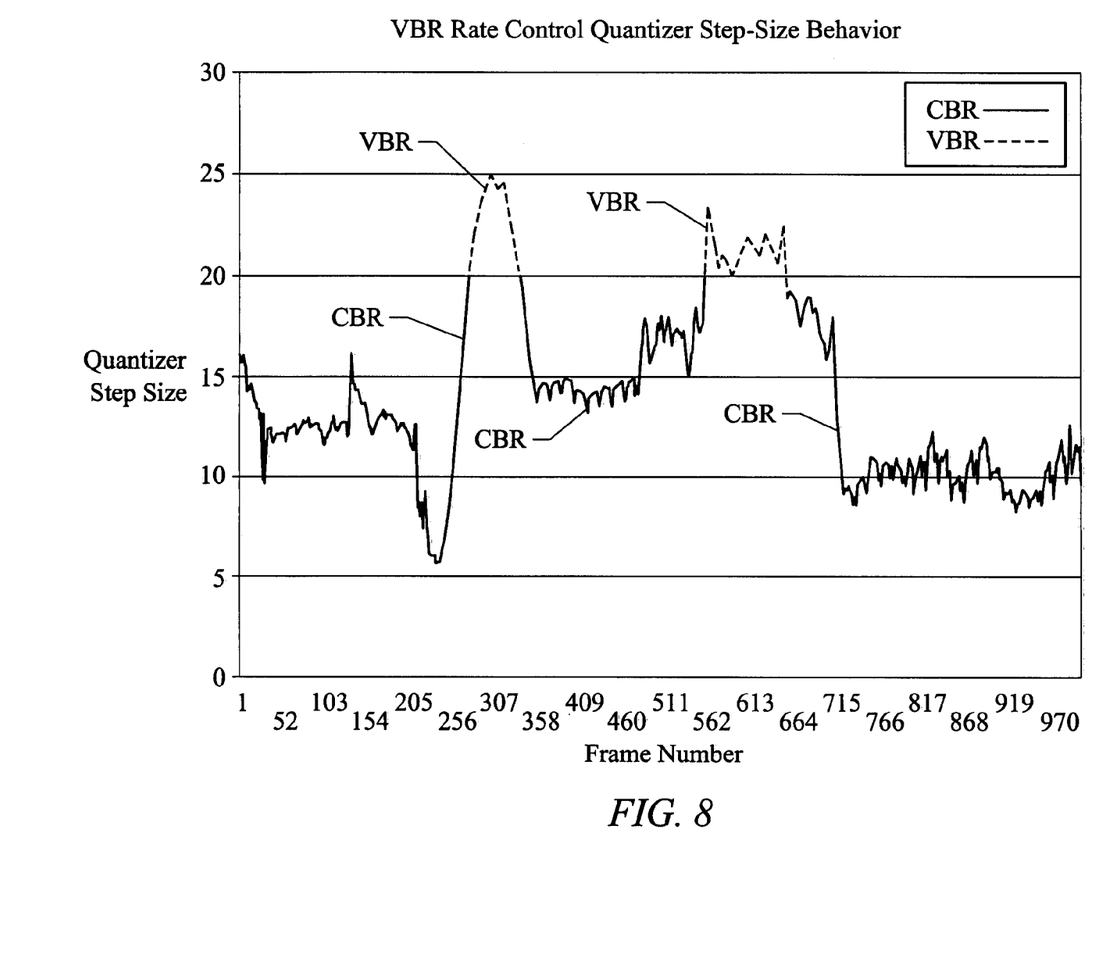
FIG. 8 is a plot illustrating exemplary quantizer step-size behavior for the dual VBR/CBR rate controller.

FIG. 8 is an exemplary plot of quantizer step size for dual mode VBR/CBR operation. In this example, the encoder operates in CBR mode and shifts mode to VBR for more complex scenes.

Thus, from these examples it will be understood that a video compression encoder of the present invention is particularly beneficial for applications where a video compression encoder is used for applications having different constraints, such as burning a CD, PVR, etc . . .

It will be understood that programmable rate controller 260 and encoder 200 may be implemented in hardware, software, firmware, or combination thereof. Consequently, a software embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX 1

Table of exemplary programmable controller parameters.

| | |
|---|---|
| $R_{avg}$ | Ravg is the target average bit rate of the output bitstream in bits/sec. However, the value is related to Q. For example, if $Q_{min}$ is specified, $R_{avg}$ represents an upper bound on the average rate, i.e., a peak average rate over the window specified. If $Q_{max}$ is specified, the encoder may not be able to reduce the bitrate sufficiently to achieve $R_{avg}$ for some content. |
| $R_{peak}$ | The maximum bit rate specified in the sequence header of the bitstream used by the video bitstream verification (VBV) model. |
| τ | The time duration in msec over which the VBR rate controller reacts to deviations in average bit rate. |
| $B_{VBV}$ | The size of the VBV buffer in bits and the implicit value for the peak rate window size. |
| $Q_{target}$ | The target quantizer scale for all macroblocks used by the VBR rate controller. The rate controller may override $Q_{target}$ to prevent VBV underflow. |
| $Q_0$ | The initial quantizer scale value for the VBR rate control algorithm. |
| $Q_{min}$ | A lower bound on the target VBR quantizer scale value for a picture. However, setting this value may prevent the encoder from achieving the average rate specified by $R_{avg}$. |
| $Q_{max}$ | An upper bound on the target VBR quantizer scale value for a picture. Note: setting this value may prevent the encoder from achieving the average rate specified by $R_{avg}$. If VBV Compliance Flag is set, the rate control may override $Q_{max}$ to prevent VBV underflow. |
| $W_P$; $W_B$ | The relative weighting for the bit allocation of P and B pictures as compared to I pictures (where $W_I$ is implicitly 1.0). Typical values are 1.0 for $W_P$ and 1.4 for $W_B$. |

APPENDIX 2

Summary table of equation symbol definitions.

| Symbol | Definition |
|---|---|
| K | Set of macroblock types |
| M | Set of picture types (I, P, or B) |
| J | Set of macroblock indices in a picture |
| i | Usually the picture index |
| j | Usually the macroblock index |
| k | Usually the macroblock type index |

APPENDIX 2-continued

Summary table of equation symbol definitions.

| Symbol | Definition |
|---|---|
| m, n | Usually the picture type index |
| $B_{peak}$ | Maximum average bits per picture |
| F | Picture rate (1/T) |
| T | Picture period (1/F) |
| $P_{x,y}(i, j)$ | $P_{x,y}(i, j)$ Luminance value of the pixel corresponding to row x and column y of macroblock j in the original input picture i |
| $R_{x,y}(i, j)$ | Luminance value of the pixel corresponding to row x and column y of macroblock j in the difference image resulting from the motion compensation of picture i |
| b(i, j) | The number of quantization-dependent bits generated from encoding macroblock j in picture i |
| $x_k(i)$ | Average complexity of macroblocks of type k in picture i |
| $\bar{x}_k(i)$ | Estimated complexity for macroblocks of type k after encoding picture i |
| X(i) | Complexity of picture i |
| $\hat{X}(i)$ | Predicted complexity for picture i (using energy scale factor) |
| $\bar{X}_m(i)$ | Estimated complexity for pictures of type m after encoding picture i |
| $W_m$ | Relative bit allocation weighting factor for pictures of type m |
| $e_k(i)$ | Average energy of macroblocks of type k in picture i |
| $\bar{e}_k(i)$ | Estimated energy for macroblocks of type k after encoding picture i |
| $E_{intra}(i)$ | Intra energy of picture i |
| $\bar{E}_{intra}(i)$ | Estimate intra energy for pictures of type m after encoding picture i |
| $\Phi_k(i)$ | The number of macroblocks of type k in picture i |
| $\bar{\Phi}_k(i)$ | Normalizing factor used to calculate $\bar{e}_k(i)$ and $\bar{x}_k(i)$ |
| $\Gamma_k(i)$ | The fraction of macroblocks of type k in picture i |
| $\bar{\Gamma}_{k,m}(i)$ | Estimated fraction of macroblocks of type k occurring in pictures of type m after encoding picture i |
| B(i) | Ideal/nominal CBR bit allocation for rolling window of N pictures based on the relative complexity of I, P, and B pictures prior to encoding picture i |
| B'(i) | Initial target CBR bit allocation for rolling window of N pictures prior to VBV compliance adjustment prior to encoding picture i |
| B''(i) | Final Target CBR bit allocation for rolling window of N pictures after VBV compliance adjustment prior to encoding picture i |
| $B_m(i)$ | Ideal/nominal CBR bit allocation for pictures of type m prior to encoding picture i |
| $B'_m(i)$ | Initial target CBR bit allocation prior to VBV compliance adjustment for pictures of type m prior to encoding picture i |
| $B''_m(i)$ | Target CBR bit allocation after VBV compliance adjustment for pictures of type m prior to encoding picture i |
| VBV(i) | VBV fullness after encoding picture i |
| $VBV_{ideal}(i)$ | Ideal VBV fullness after encoding picture i if rate-quant model is accurate and in steady-state |
| $VBV_{predict}(i)$ | Predicted VBV fullness after encoding picture i based on the target CBR bit allocation |
| $Q_{CBR}(i)$ | The CBR picture-level quantizer scale value for encoding picture i |
| $Q'_{VBR}(i)$ | The preliminary VBR picture-level quantizer scale value for encoding picture i that does not guarantee VBV compliance |
| $Q_{VBR}(i)$ | The VBR picture-level quantizer scale value for encoding picture i |
| q(i, j) | The quantizer scale value for encoding macroblock j in picture i |
| $\tau$ | Time constant for the VBR algorithm |
| $K_i, K_p$ | Filter coefficients for the VBR PI feedback loop |
| $\alpha(i)$ | Picture-level aging parameter used to calculate $\bar{E}_{intra}(i)$ and $\bar{\Gamma}_{k,m}(i)$ |
| $\alpha_k(i)$ | Macroblock-level aging parameter used to calculate $\bar{e}_k(i)$, $\bar{x}_k(i)$, and $\bar{\Phi}_k(i)$ |

APPENDIX 3

Summary table of exemplary signals at different points in the rate controller.

| Signal | Input/Output Parameters |
|---|---|
| 1 | $\{P_{x,y}(i, j); j \in J\}$ $P_{x,y}(i, j)$ are Luminance values of each pixel corresponding to row x and column y of macroblock j in the original input picture i, where J is the set of macroblock indices in a picture |
| 2 | $\{R_{x,y}(i, j); j \in J\}$ are the luminance value of the pixel corresponding to row x and column y of macroblock j in the difference image resulting from the motion compensation of picture i |
| 3 | Macroblock coding decisions for picture i |
| 4 | $Q_{CBR}(i)$ The CBR picture-level quantizer scale value for encoding picture i |
| 5 | $\{b(i, j); j \in J\}$, are the number of quantization-dependent bits generated from encoding macroblock j in picture i $\{q(i, j); j \in J\}$ are the corresponding quantizer scale value for encoding macroblock j in picture i |
| 6 | VBV(i − 1), where VBV fullness after encoding picture i |
| 7 | $\{\phi_k(i, j); k \in K, j \in J\}$ $\{\Phi_k(i); k \in K\}$ is The number of macroblocks of type k in picture i $\{\bar{\Phi}_k(i); k \in K\}$ Normalizing factor used to calculate $\bar{e}_k(i)$ and $\bar{x}_k(i)$ $\{\Gamma_k(i); k \in K\}$ The fraction of macroblocks of type k in picture i $\{\bar{\Gamma}_{m,k}(i); k \in K, m \in M\}$ is the Estimated fraction of macroblocks of type k occurring in pictures of type m after encoding picture i $\{e_k(i); k \in K\}$ is the Average energy of macroblocks of type k in picture i $\{\bar{e}_k(i); k \in K\}$ is the Estimated energy for macroblocks of type k after encoding picture i |
| 8 | $E_{intra}(i)$ is the Intra energy of picture i $\bar{E}_{intra}(i)$ is the Estimate intra energy for pictures of type m after encoding picture i |
| 9 | $\{\bar{X}_m(i); m \in M\}$; where is the Estimated complexity for pictures of type m after encoding picture i and M is the Set of picture types (I, P, or B) $\hat{X}(i)$ is the Predicted complexity for picture i (using energy scale factor) |
| 10 | $B''_{m_i}(i)$, where Target CBR bit allocation after VBV compliance adjustment for pictures of type m prior to encoding picture i $\bar{X}_{m_i}(i)$ is the Estimated complexity for pictures of type m after encoding picture i |

What is claimed is:

1. A rate controller for a block-based video encoder, comprising:

a variable bit rate (VBR) video controller generating a first quantization step size for a current picture;

a constant bit rate (CBR) video controller operating in tandem and independently from the VBR controller and generating a second quantization step size for the current picture; and a selector configured to receive independent calculations of said first quantization step size and said second quantization step size for the current picture from the VBR video controller and the CBR video controller and select a maximum permissible quantization step size from said first quantization step size and said second quantization step size for use by a quantizer in quantizing transform data associated with the current picture.

2. The rate controller of claim 1, further comprising:

an input for processing at least one parameter of operation for at least one of said VBR controller and said CBR controller.

3. The rate controller of claim 2, wherein said at least one parameter includes at least one of a target peak bit rate, a target average bit rate, a maximum quantization scale, a minimum quantization scale, a target quantizer scale, a target buffer scale, a VBV buffer size, and a time constant for said VBR rate controller to track changes in long-term average bit rate.

4. The rate controller of claim 1, wherein an average bit rate of said VBR controller tracks variations in long-term average bit rate of an output bit stream of said block-based video encoder.

5. The rate controller of claim 4, wherein said VBR controller comprises a proportional integral controller adapted for tracking variations in long-term average bit rate.

6. The rate controller of claim 5, wherein said VBR controller includes a programmable time constant for adapting to changes in long-term average bit rate.

7. The rate controller of claim 5, wherein said CBR controller comprises:
 a picture analysis module configured to classify macroblocks of a current picture into at least two different macroblock types and calculate a statistical indicator of complexity for each macroblock type;
 a complexity model module coupled to said picture analysis module configured to form a predicted picture complexity estimate based on a statistical frequency of said macroblock types within said current picture;
 a bit allocation module adapted to form a bit allocation consistent with said predicted picture complexity estimate; and
 a picture-level quantizer assignment module adapted to assign a quantization step size consistent with said bit allocation.

8. The controller of claim 7, wherein said indicator of complexity comprises an energy value calculated from an activity measurement of macroblocks.

9. The controller of claim 7, wherein said bit allocation module comprises:
 an ideal bit allocation module configured to calculate an ideal bit allocation based on an estimated complexity of a picture;
 a video bitstream verification (VBV) fullness adjustment module configured to adjust said ideal bit allocation to maintain a desired VBV buffer fullness range; and
 a VBV compliance adjustment module configured to adjust said ideal bit allocation to maintain VBV compliance.

10. A constant bit rate controller for a video compression encoder, comprising:
 a picture analysis module configured to classify macroblocks within a current picture by type, each macroblock type having distinct rate-quantization properties, determine a statistical frequency of each of at least two different types of macroblocks within the current picture and an activity-based energy value for each macroblock t e indicative of a number of bits required to encode each macroblock type, and generate at least one statistical indicator of the complexity of each of said at least two different types of macroblocks based on quantization-dependent bits in the each of said at least two different types of macroblocks;
 a complexity model module coupled to said picture analysis module configured to form a predicted picture complexity estimate based on statistics of said macroblocks;
 a bit allocation module adapted to form a bit allocation consistent with said predicted picture complexity estimate; and
 a picture-level quantizer assignment adapted to assign a quantization step size to said quantization-dependent bits consistent with said bit allocation.

11. The constant bit rate controller of claim 10, wherein said bit allocation module comprises:
 an ideal bit allocation module configured to calculate an ideal bit allocation based on an estimated complexity of a picture;
 a video bitstream verification (VBV) fullness adjustment module configured to adjust said ideal bit allocation to maintain a desired VBV buffer fullness range;
 a VBV compliance adjustment module configured to adjust said ideal bit allocation to maintain VBV compliance.

12. The constant bit rate controller of claim 10 wherein said energy value is determined by a calculation including: a difference measurement of each macroblock type between original pixel luminance values and mean pixel luminance values.

13. The constant bit rate controller of claim 10, wherein said at least one statistical indicator of said picture analysis module comprises a time averaged energy estimate for at least one macroblock type.

14. The constant bit rate controller of claim 10, wherein said complexity model module generates a measurement of the complexity of each type of macroblock and a running estimate of macroblock type complexities.

15. A method of constant bit rate (CBR) rate control in a video compression encoder, comprising:
 for a current picture, classifying macroblocks by type and determining a statistical frequency of the macroblock types, each macroblock type having distinct rate-quantization properties;
 generating a statistical indicator indicative of a complexity of each type of macroblock based on quantization-dependent bits in each type of macroblock;
 determining an activity-based energy value for each macroblock type indicative of a number of bits required to encode each macroblock type;
 predicting picture complexity to form a predicted picture complexity by forming a weighted sum of macroblock types, wherein each macroblock type has a weight that increases with its statistical frequency and with a value of said statistical indicator;
 generating a bit allocation consistent with said predicted picture complexity; and
 assigning a quantizer step size consistent with said bit allocation.

16. The method of claim 15, wherein said determining an activity-based energy value for each macroblock type comprises:
 calculating a difference measurement of each macroblock type between original pixel luminance values and mean pixel luminance values.

17. The method of claim 16,
 wherein the activity-based energy value is formed by scaling a corresponding difference measurement value by an empirical factor and averaging scaled difference measurement values over all macroblocks of the same type in said current picture.

18. The method of claim 17, further comprising: utilizing a macroblock aging parameter to generate a time averaged energy estimate for at least one macroblock type.

19. The method of claim 18, further comprising: generating a measurement of the complexity of each type of macroblock.

20. The method of claim 17, further comprising: generating a running estimate of macroblock type complexities.

21. The method of claim 20 wherein said generating a running estimate of macroblock type complexities comprises: combining macroblock complexities for a current picture with values of a previous picture.

22. The method of claim 17, wherein said values of said previous picture are weighted by an aging factor.

23. The method of claim 15, further comprising: generating an intra energy output for bit prediction in a video bitstream compliance check.

24. The method of claim 23, further comprising: measuring the intra energy for a current picture and combining it with a measure of the intra-energy for a previous picture.

25. The method of claim 24, wherein said measure of the intra-energy for said previous picture is weighted by a picture level aging parameter.

26. A method of variable bit rate control in a video compression encoder having a variable bit rate controller with a peak bit rate and a selectable average bit rate, comprising:
measuring changes in the average bit rate of an output bitstream of said encoder over time for a current picture; and
adjusting a target bit allocation for said current picture by second-order feedback control based on said changes and according to a time constant set to be larger than a scene.

27. The method of claim 26, wherein said time constant is set to be larger than the longest scene of any given complexity in the bitstream.

28. The method of claim 26, wherein said adjusting comprises:
adapting to said changes in average bit rate according to a proportional integral controller response.

29. A method of rate control in a video compression encoder, comprising:
generating a first quantization step size using a constant bit rate video encoder for a current picture;
forming a second quantization step size using a variable bit rate video encoder operating in tandem and independently from the constant bit rate encoder for the current picture; and
receiving independent calculations of said first quantization step size and said second quantization step size for the current picture from the constant bit rate encoder and the variable bit rate encoder to select a maximum quantization step size from said first quantization step size and said second quantization step size for use in quantizing compressed video image data associated with the current picture.

30. The method of claim 29, wherein said forming comprises:
tracking long-term average bit rates.

31. The method of claim 29, wherein said forming comprises:
tracking long-term average bit rates using a proportional integral encoder.

* * * * *